H. D. GARDY.
STREET CAR FENDER.
APPLICATION FILED FEB. 11, 1909.
929,205.
Patented July 27, 1909.
2 SHEETS—SHEET 2.
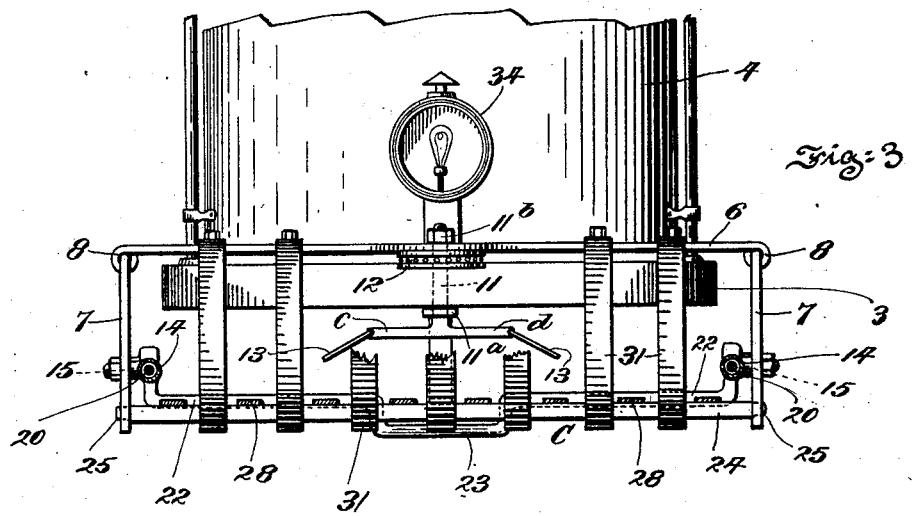
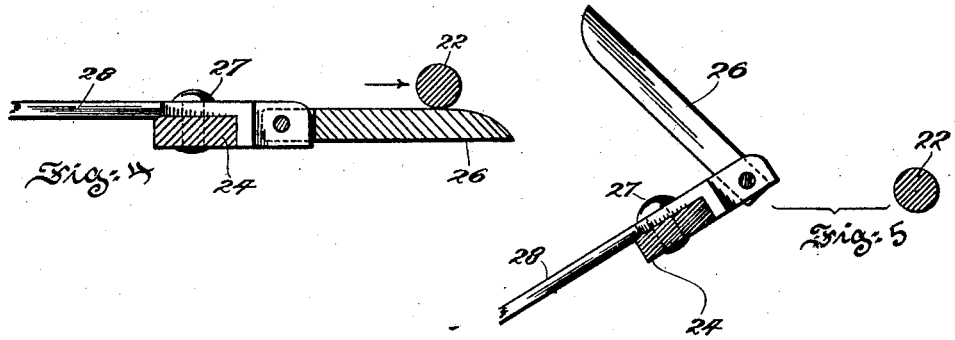
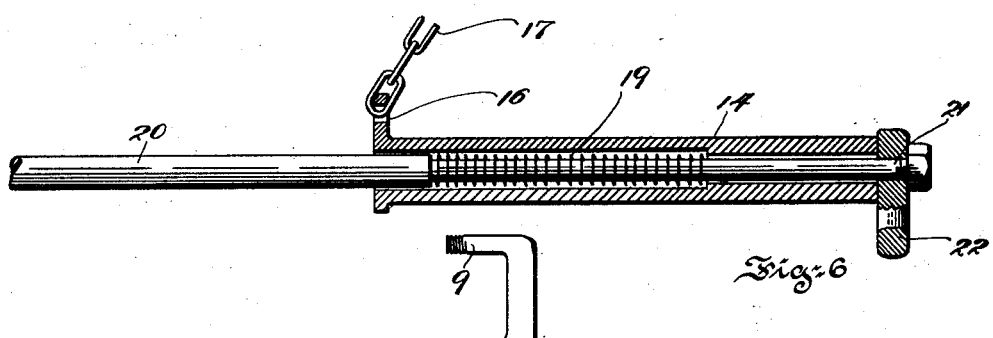
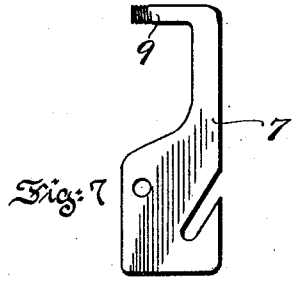
WITNESSES:
INVENTOR.
Henry D. Gardy
BY
William F. Jackson
ATTORNEY.

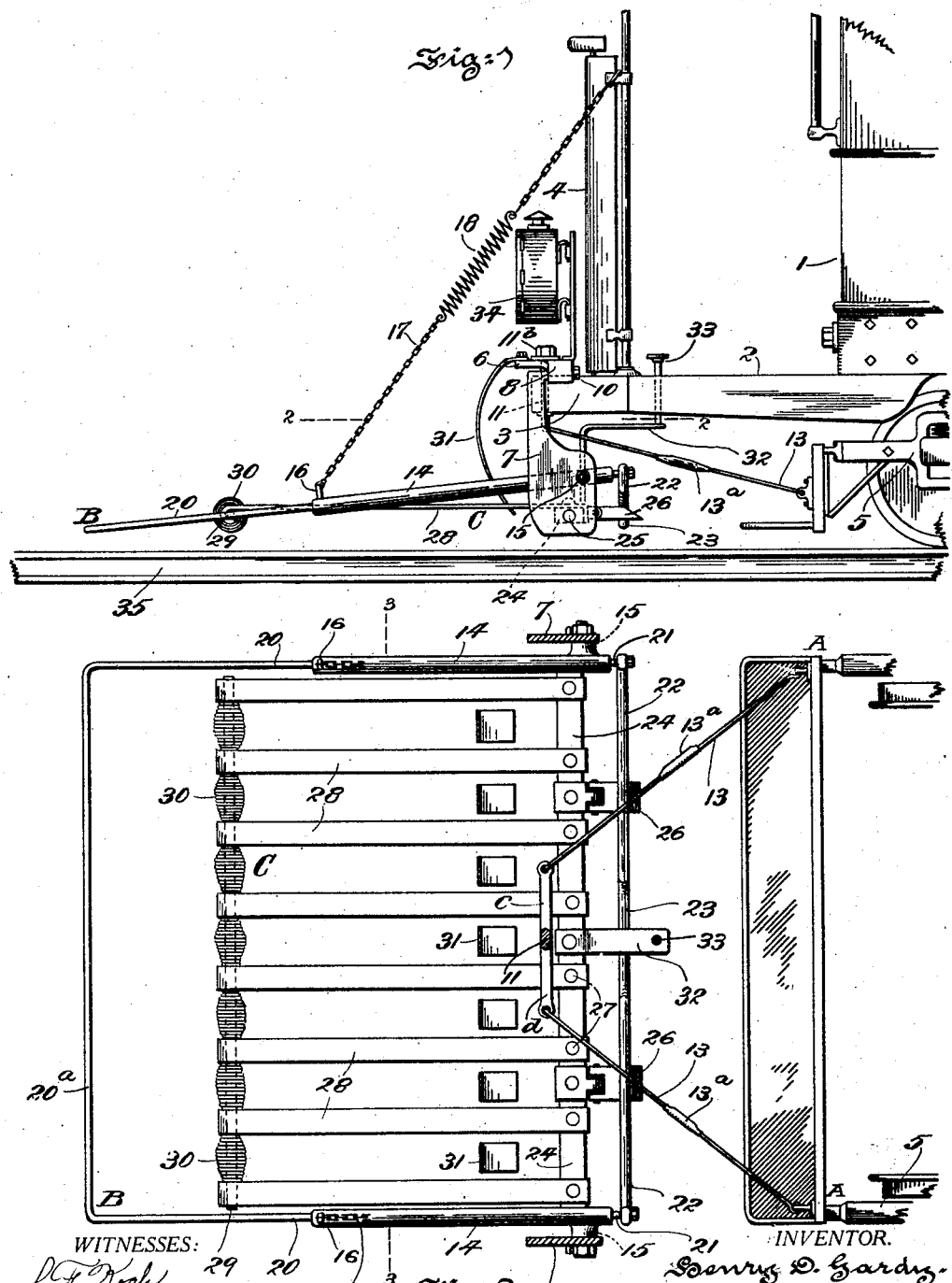

UNITED STATES PATENT OFFICE.

HENRY D. GARDY, OF PHILADELPHIA, PENNSYLVANIA, ASSIGNOR, BY DIRECT AND MESNE ASSIGNMENTS, OF THREE-FOURTHS TO TAYLOR C. BURKE, OF CHESTER, PENNSYLVANIA.

STREET-CAR FENDER.

No. 929,205.  Specification of Letters Patent.  Patented July 27, 1909.

Application filed February 11, 1909. Serial No. 477,403.

*To all whom it may concern:*

Be it known that I, HENRY D. GARDY, a citizen of the United States, residing at Philadelphia, in the county of Philadelphia and State of Pennsylvania, have invented certain new and useful Improvements in Street-Car Fenders, of which the following is a specification.

This invention relates to the pivoted fenders or guards located at the end or ends of a car and adapted to be automatically lowered in case of accident and has particular relation to that class of fenders that may be moved to follow the curves of the track.

The principal object of the present invention is to provide a fender that will automatically follow the curvatures of a track over which a car is running, thereby avoiding striking passing vehicles or pedestrians who approach too near the outside of a curve.

A further object of the present invention is to automatically cause the head-light of a car to follow the curvatures of a track and throw the rays of its light parallel with the track in contradistinction from right angles thereto.

A still further object of the present invention is to provide a fender automatically adjustable from an elevated position to a lower position in the event of its forward end striking an obstruction.

A still further object of the present invention is to provide means operated by the motorman whereby the fender may be automatically reset.

Other objects of the invention will appear hereinafter.

The invention consists of the improvements hereinafter described and finally claimed.

The nature, characteristic features and scope of the invention will be more fully understood from the following description, taken in connection with the accompanying drawings forming part hereof and in which:—

Figure 1, is a view in side elevation of the front end of a car equipped with a fender embodying the invention. Fig. 2, is a view in section taken upon the line 2—2, of Fig. 1. Fig. 3, is a view in section taken upon the line 3—3, of Fig. 2. Figs. 4, and 5, are detail views of locking devices hereinafter referred to. Fig. 6, is a view in section of the cushioned parts of the fender, and Fig. 7, is a view in side elevation of one of the arms used for supporting the fender.

In the drawings the car body is designated 1, which includes the platform 2, bumper 3, and dasher 4. The car truck is designated 5, and usually has swivel connection with the car body. All of these parts are of ordinary and well understood construction.

Pivotally supported upon the upper face of the bumper 3, is a swinging frame 6, depending from which, at each end thereof, are supports 7. As shown the frame 6, is provided with sleeve-like portions, 8, for receiving the screw-threaded extensions 9, of the supports 7, and the said supports are securely fastened to said frame 6, by nuts 10. The frame 6, and its supports 7, are pivotally secured to the bumper 3, by means of an inverted generally T-shaped member 11, having a shoulder $11^a$, and secured by means of the nut $11^b$. Ball bearings 12, may be interposed between the frame 6, and bumper 3, if desired. Connecting the arms $c$—$d$, of the inverted T-shaped member 11, with the outer ends A—A of the truck 5, are members shown as being rods 13, provided with turn buckles $13^a$. By this arrangement the frame 6, and supports 7, carrying the fender parts hereinafter to be described will automatically follow the movement of the truck 5, when rounding a curve entirely independent of the position of the car body. Having pivotal relation as at 15, with the supports 7, are a pair of sleeves 14. Passing therethrough are the side members 20, of a generally U-shaped forwardly projecting cushioned frame constituting a trip, B, which upon the part $20^a$, coming into contact with an obstruction is driven inwardly in order to permit the guard or fender proper to be released and dropped. As shown in the drawings the sleeves 14, are provided at their forward ends with eyes 16, connecting which and the dasher 4, are supporting chains 17, provided with springs 18. The parts 20 that pass through the sleeves 14, have cushioned relation therewith as at 19, and have secured to their screw-threaded ends 21, and extended across the rear of the fender a bar 22, having arranged centrally thereon a depression 23, for a purpose to be presently described. The above described parts constitute a generally rectangular frame.

Pivotally carried by the supports 7, and arranged within the generally rectangular frame is the guard or fender proper C, which is adapted to be automatically tripped by the above described trip B. This guard or fender proper as shown in the drawings consists of a beam 24, having pivotal relation with the supports 7, as at 25, and provided with pivotally arranged detents 26, as clearly illustrated in Figs. 4, and 5, the purpose of which will be presently described. Secured to the beam 24, as at 27, are forwardly extending strips 28, the forward ends of which carry a rod 29, suitably arranged upon which and located between the various strips 28, are generally elliptical shaped springs 30. To complete the guard, strips 31, carried by the frame 6, are extended downward and between the above described strips 28. Carried by the beam 24, and projected upwardly therefrom is an angular depression member 32, adapted to be operated when desired by means of a foot lever 33, upon the platform 2, of the car 1. Suitably carried by the frame 6, is a headlight 34, which as will be readily understood will respond to the movement of the frame 6, when turned by the truck 5, and throw the rays of its light parallel with the track in contradistinction from right angles thereto.

A brief description will now be given of the operation of the fender. The normal position of the guard C, is that disclosed in Figs. 1, 2, and 3, that is with the trip B, close to the track 35, and with the detents 26, beneath the rod 22, supporting in horizontal position the said guard. Should a pedestrian be in the way of the car the part 20ª, when it comes in contact with the said pedestrian will move the parts 20 backward through the sleeve 14, push away the rod 22 from the detents 26, permit the guard C, to move around its pivotal point 25, and cause its forward end to drop to the track, whereupon the pedestrian will be gathered in upon the strips 28, the strips 31, preventing the possibility of his sliding beneath the car. In this connection it may be remarked that the elliptical springs 30, not only serve to form a resilient or cushion like edge but travel along the ground and act as rollers for the guard or fender proper. It may be here remarked that when the forward end of the guard C, drops to the track, the impact thereof has the tendency to throw the detents 26, backward to the position shown in Fig. 5. To reset the guard C, the motorman may depress the foot lever 33, thus causing the member 32, to move the said guard around its pivotal point 25, thereby causing the forward end of the same to be moved upward and the rear end carrying the detents 26, downward. As the detents 26, move downward or in other words from the position shown in Fig. 5, they will ride over the bar 22, and upon reaching a point below the plane of the pivot point 25, will gravitate and assume a position in the same plane as the guard or fender proper and form a rigid continuation thereof (see Fig. 4) and abut against the underside of the bar 22. The bar 22, serves to hold the fender proper in a substantially horizontal position. It may be here remarked that the detents 26, are capable of swinging upwardly as shown in Fig. 5, but cannot swing downwardly farther than in the position shown in Fig. 4, due to the fact that upon reaching a substantially horizontal position, the rear end of the detents 26, abut against the lugs of the beam 24, (see Figs. 2 and 4). In this connection it may be remarked that the part 23, of the rod 22, is bent downwardly so as to afford convenient space for moving the member 32, far enough in the direction of the track 35, to permit the detents 26, to pass beneath the bar 22.

What I claim is:—

1. In combination a car track, a car body, a fender having swivel connection with a fixed portion of said car body and means operatively connecting the truck and fender whereby the fender will be radially moved around its swivel point to conform to curvatures of the track over which the car is traveling.

2. In combination a car truck, a car body, a fender having pivotal relation with a fixed portion of said car body, a head light mounted upon the fender parts and means operatively connecting the truck and fender whereby the fender, including the headlight, will be radially moved from its pivoted point to conform to curvatures of the track over which the car is traveling.

3. In a car fender the combination of a supporting frame carried by the car, a guard pivoted at its inner end to the frame and provided adjacent its pivotal point with movable detents, a pair of forwardly extending sleeves pivotally carried by the frame, a general rectangular trip extending forwardly and rearwardly of the guard the side portions of which penetrate and have cushioned relation with said sleeves and the rear portion of which is adapted to engage said detents until the forward portion of the trip strikes an obstruction thereby releasing said guard and its complemental detents and means for resetting the guard.

4. In combination a car truck, a car body, a fender having swivel connection with a fixed portion of said car body, means operatively connecting the truck and fender whereby the fender will be radially moved around its swivel point and conform to curvatures of the track over which the car is traveling and trip mechanism for causing the fender to drop to the track when said trip strikes an obstruction.

5. In a car fender the combination of a supporting frame carried by the car, a cushioned trip carried by the frame, a guard having hinged detents pivotally connected to said frame said detents being adapted to engage the trip until the said trip hits an obstruction to release and drop the guard and means for resetting the guard.

In testimony whereof I have signed my name.

HENRY D. GARDY.

Witnesses:
S. F. KOCH,
WILLIAM J. JACKSON.